United States Patent
George et al.

(12)

(10) Patent No.: US 6,709,538 B2
(45) Date of Patent: Mar. 23, 2004

(54) METHOD OF MAKING A LAMINATED COMPOSITE RADIUS FILLER

(75) Inventors: Panagiotis E. George, Sumner, WA (US); Kirk B. Kajita, New Castle, WA (US); Barry P. Van West, Bellevue, WA (US)

(73) Assignee: The Boeing Company, Seattle, WA (US)

( * ) Notice: Subject to any disclaimer, the term of this patent is extended or adjusted under 35 U.S.C. 154(b) by 61 days.

(21) Appl. No.: 10/153,288

(22) Filed: May 21, 2002

(65) Prior Publication Data

US 2003/0024630 A1 Feb. 6, 2003

Related U.S. Application Data (62) Division of application No. 09/793,810, filed on Feb. 23, 2001, now Pat. No. 6,562,436.
(60) Provisional application No. 60/184,871, filed on Feb. 25, 2000.

(51) Int. Cl.[7] ............................................. B32B 31/18
(52) U.S. Cl. ...................................... 156/73.3; 156/73.1
(58) Field of Search ............................... 156/73.1, 73.3, 156/580.1, 580.2; 428/105, 107, 112, 119, 133

(56) References Cited

U.S. PATENT DOCUMENTS

| | | | | |
|---|---|---|---|---|
| 2,124,668 A | * | 7/1938 | Freedlander | 428/112 |
| 2,796,911 A | * | 6/1957 | Waugh | 428/112 |
| 4,331,723 A | * | 5/1982 | Hamm | 428/61 |
| 5,639,535 A | * | 6/1997 | McCarville | 428/119 |
| 5,789,061 A | * | 8/1998 | Campbell et al. | 429/119 |
| 5,827,383 A | * | 10/1998 | Campbell et al. | 156/73.1 |
| 5,833,786 A | * | 11/1998 | McCarville et al. | 156/92 |
| 5,919,543 A | * | 7/1999 | McCarville et al. | 428/112 |
| 6,562,436 B2 | * | 5/2003 | George et al. | 428/105 |

FOREIGN PATENT DOCUMENTS

| | | |
|---|---|---|
| EP | 0 287 103 A | 10/1988 |
| EP | 0 768 167 A | 4/1997 |

OTHER PUBLICATIONS

Database Compendex 'Online', Engineering Information, Inc., New York, NY, US; King, Michael J. et al., "Fatigue of tapered sandwich structures", database accession No. E2000114994536, XP002177317 abstract.

* cited by examiner

*Primary Examiner*—James Sells
(74) *Attorney, Agent, or Firm*—John C. Hammar (57) ABSTRACT

A laminated composite (multi-ply) radius filler includes a plurality of woven fabric reinforced plies cut to fill a radius gap (including, if appropriate, intentional overfill) to increase absolute strength, to increase specific strength, or to reduce cost by reducing cracking and distortion in the radius of a composite assembly. The present invention also describes the method of manufacture and method of use for such laminated composite radius filler.

3 Claims, 6 Drawing Sheets

METHOD OF MAKING A LAMINATED COMPOSITE RADIUS FILLER

REFERENCE TO RELATED APPLICATION

The present application is a divisional application based upon U.S. patent application Ser. No. 09/793,810, filed Feb. 23, 2001 U.S. Pat. No. 6,562,436, which claims the benefit of U.S. Provisional Patent Application No. 60/184,871, filed Feb. 25, 2000.

TECHNICAL FIELD

The present invention relates to a laminated composite radius filler, its method of manufacture, and its method of use, especially in making high performance, high quality lower cost, aerospace composite assemblies.

BACKGROUND ART

Failure of composites, especially in aerospace applications, often initiates in the resin in the radius filler (i.e., "noodle") that fills the interface between plies in laminated joints. Cracks in the radius filler can be formed into the composite during manufacture (e.g., improper tooling, improper handling of tools, or residual strain), can grow from voids that provide a nucleation site for crack growth, or can arise when structural loading overstresses the resin. Residual tensile strain is often designed into composites today, and arises from mismatch in the coefficient of thermal expansion between the radius filler and the surrounding structure, especially the reinforcing fibers, or from shrinkage of the resin that arises during cure of the composite.

Composite spars or ribs are made by binding two "C" or "U" channels together to form a web with flanges. The channels generally comprise a plurality of plies of fiber-reinforced resin, commonly in the form of prepreg. The fiber reinforcement might be unidirectional tape or woven fabric, and, most commonly, is carbon fiber or fiberglass. For aerospace structure, it normally is woven carbon fiber fabric. The fabric usually is not isotropic with respect to its reinforcement strength. It may be easier to stretch or to expand the fabric in its width rather than in its length. In the different plies, the fabric can be oriented in different directions, specified as an angle of rotation from a reference direction. That is, the orientation might be 0° or +45° or −45° or 90°, although other orientations are sometimes used. Here, "+45°" might mean that the fabric is rotated 45° clockwise while "−45°" might mean a 45° rotation in the counterclockwise sense. Ply orientation in the laminate evens the strength or impact resistance making the composite more uniform or less angle dependent. Oriented composites may be extremely strong in the direction of unidirectional reinforcing fibers while being relatively weak perpendicular to those fibers.

Figure 11:
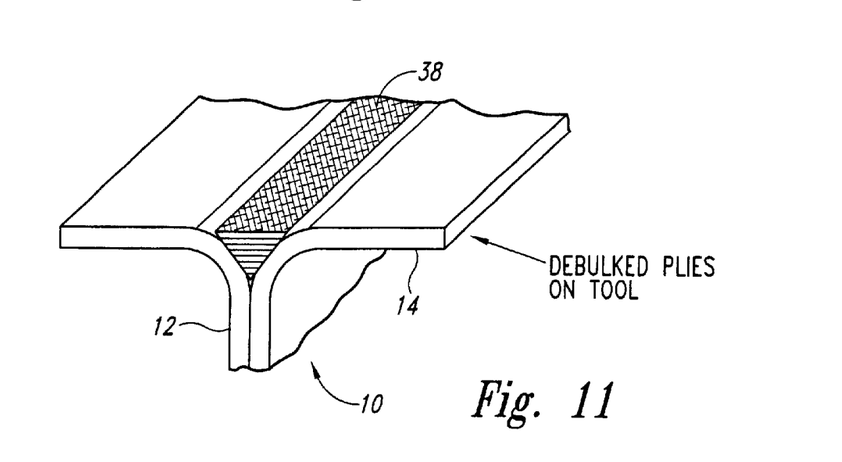
FIG. 11 shows the radius filler of FIG. 6 installed in the gap caused by the curvature of joined "C" channels in a typical spar.

The plies are bent in a predetermined radius to form the "C" or "U" channel. When the channels are joined at the webs, a dimple occurs along the flange because of these radii. A radius filler fills the dimple. (See FIG. 1 or 11.) Using a radius filler prevents distortion that otherwise would occur when the spar or rib were loaded with a bending or twisting moment. Distortion can reduce the strength of the composite significantly and can also increase part variability (i.e., the spars simply are not the same shape from part to part).

Existing designs for radius fillers have produced fillers that are structurally inadequate, that are challenging and expensive to produce, or that leave the structural integrity of the resulting composite in question. Such designs often force post-manufacturing, non-destructive evaluation (NDE) and inspection (NDI), which slows production flow, increases cycle time, and increases cost. Therefore, there is a need for an improved radius filler that is easy and inexpensive to manufacture and structural sound to prevent distortion. The radius filler of the present invention allows the production of stronger, higher quality composites with lower variability while improving flow and cycle time and simultaneously reducing the overall composite cost.

When cracks cannot be avoided through a robust design as now achievable with the radius filler of the present invention, the structure needs to be made larger and heavier than optimal to withstand the design loads. Performance or payload in the aircraft is diminished because of the larger, heavier parts. Higher costs are also incurred both in its production and use.

Designers would like to build parts where performance of the radius filler is challenged even more severely than in existing, fielded aircraft. That is, designers would like the radius fillers having increased structural properties to withstand even greater stresses and pull-off loads than is achievable today. Such a radius filler would allow higher performance wings to be built. Therefore, absolute strength of the composite assembly is important. The radius filler of the present invention provides higher absolute strengths than are achievable with existing radius fillers. Therefore, the radius filler of the present inventions expands the domain of acceptable composite designs that can be used to meet aerospace challenges.

SUMMARY OF THE INVENTION

A laminated composite radius filler "a noodle" of the present invention better meets the challenges faced with composite design by reducing the initiation of processing (manufacturing) induced cracks or premature cracking of composite assemblies, like a spar or skin-stiffener interface, under structural loading. That is, the "noodle" no longer is the weakest link in the composite structure or, if it remains the weakest, it still has a higher absolute strength than previous radius fillers allowed.

The present invention relates to a laminated composite radius filler having higher resistance to distortion, to its method of manufacture, and to its method of use. The radius filler permits design and manufacture of composite structures, like spars, ribs, or skin/stiffener assemblies, that have higher resistance to distortion, higher absolute strength, increased specific strength (i.e., strength per unit weight), lower part variability, and lower production cost. The radius filler enables the manufacture of stronger while lighter composite structure, which enables improved wing or other airfoil design. Cracking failure in the radius filler is reduced and pull-off strength is increased.

The present invention relates to the radius filler, to its method of manufacture, to its method of use, and to products that use it. A preferred radius filler of the present invention has a laminated fiber body and a unidirectional tip. The laminated fiber body typically has two distinct sections that are trapezoidal in cross-section. The upper section, for example, may have 14 or 18 plies of IM7/5250-4 thin tape with ±45° orientation (i.e., the plies alternate from having a ±45° orientation relative to the X-axis and −45° orientation). The lower section is made from the same material but has 10 plies. Typically the noodle is completed with three additional, base plies. The number of plies and sections are selected to configure the radius filler to the shape of the dimple. To simplify the discussion, this description will focus on substantially triangular radius filler for T-section joints (such as joint between a stiffener and a skin), but other configurations for the dimple and the radius filler are possible.

DETAILED DESCRIPTION

Figure 1:
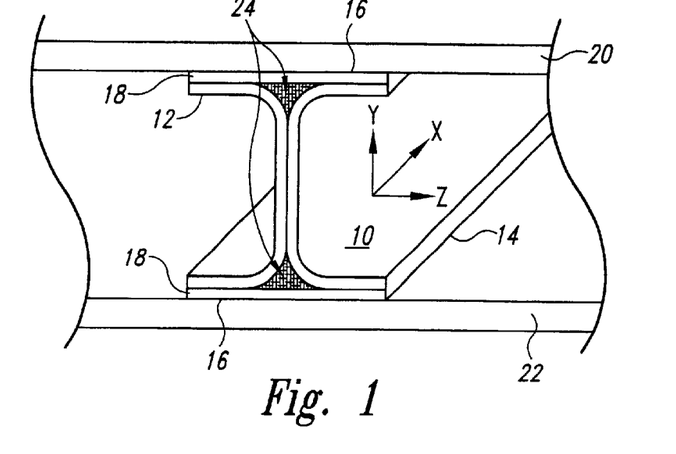
FIG. 1 is a sectional view of a typical wingbox in aerospace construction showing a rib or spar joined to upper and lower skins. A T-section at the skin/stiffener interface of the rib or spar with the skin includes a radius filler.
Figure 8:
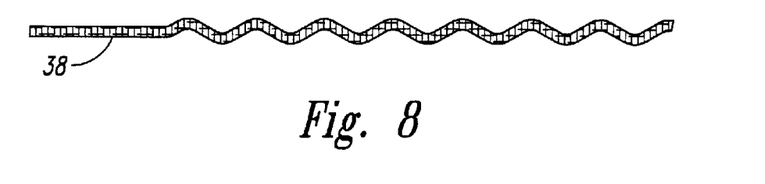
FIG. 8 is an isometric of the radius filler of FIG. 6 formed into a sine wave shape.
Figure 9:
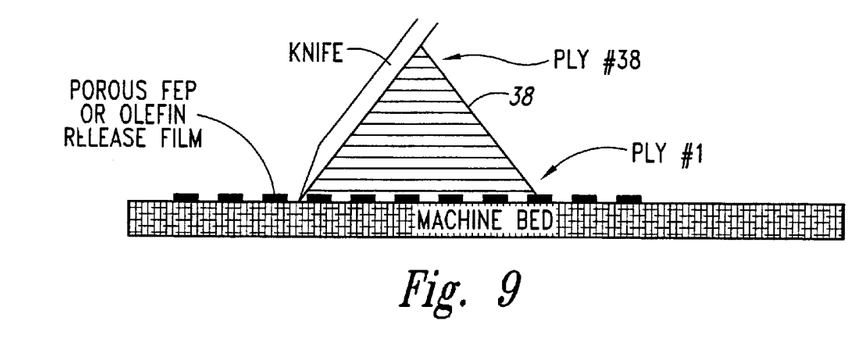
FIG. 9 illustrates cutting a radius filler of FIG. 6 from a debulked laminate using an ultrasonic knife carried on a sonotrobe horn on an American GFM ultrasonic cutting table.

As shown in FIG. 1, a spar 10 has a left 12 and right 14 "C" channel bonded together. The spar is bonded through flanges 16 defined by the "C" channels 12 and 14 and, optional, facing plies 18 to an upper 20 and lower 22 skin in an aerospace composite assembly typical of a wing, vertical stabilizer, horizontal stabilizer, or the like. The "C" channels in the spar 10 have opposite curvatures that create a dimple when the channels are bonded together. A radius filler 24 fills the volume of the dimple. The web of the spar 10 can be straight, but often in fighter aircraft it is shaped like a sine wave to increase its strength. The radius filler 24 assumes the geometry of the dimple. For a sine wave spar, the radius filler 24 is also a sine wave (FIG. 8).

The spar 10 and skins 20 and 22 are fiber reinforced resin matrix composites. In our tests, we used BMS 5250-4 BMI (bis-maleimide) thermosetting resin reinforced with carbon fiber fabric with the spar 10 co-cured to the skins 20 and 22 radius fillers 24 of the present invention were made with BMS 5250-4 BMI thin tape with a designed overfill of 115%. We have observed little drop in strength for smaller radius fillers so long as the radius filler at least substantially fills the dimple. We also have observed some strengthening if greater overfill, up to as large as 190%, is used. The strength is relatively inelastic to variations in the dimensions of the radius filler within these broad boundaries.

Figure 2:
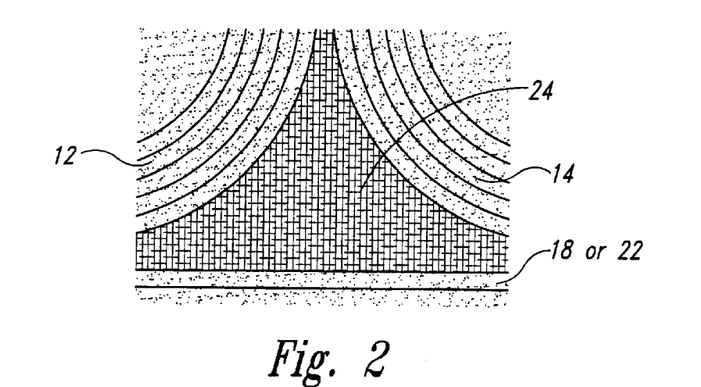
FIG. 2 is a photomicrograph of a radius filler having unidirectional fiber reinforcement in the X-direction identified in FIG. 1. This figure also shows the plies of the spar and skin.
Figure 3:
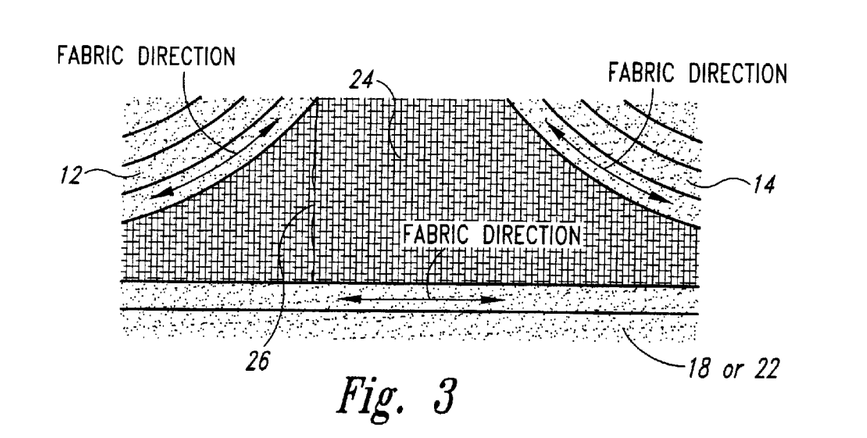
FIG. 3 is another photomicrograph similar to FIG. 2 showing a crack in a unidirectional noodle of the type shown in FIG. 2.

FIGS. 2 and 3 show a common radius filler made by pultruding rolled unidirectional tape, like BMS 5250-4 thin tape in a die or by extruding or pulling the rolls through shaped roller dies. While the shape we illustrate in this application has a triangular cross-section, the radius filler can assume other shapes, like a diamond or star, shown in U.S. Pat. No. 5,833,786, which we incorporate by reference. Unidirectional radius fillers suffer from cracking 26, as shown in FIG. 3. Pure resin adhesive radius filler also are plagued with cracking.

Figure 4:
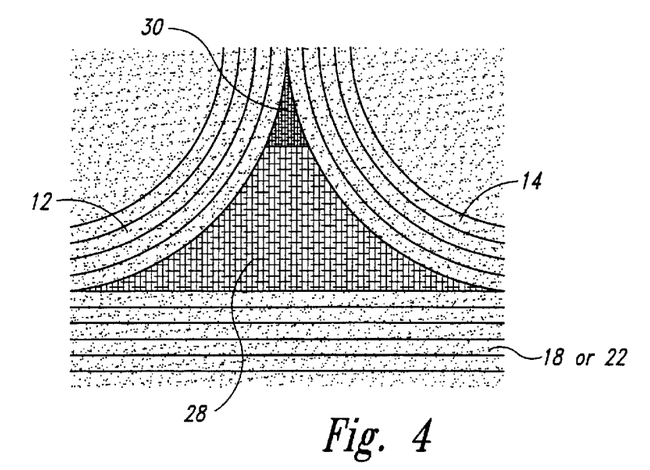
FIG. 4 is yet another photomicrograph, similar to FIG. 2, showing a preferred embodiment of a radius filler of the present invention in a spar-skin interface.
Figure 5:
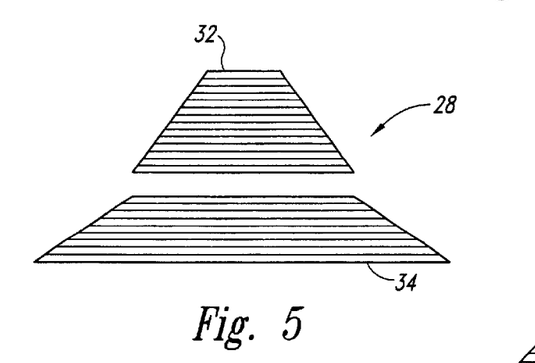
FIG. 5 shows a cross-section of ply stacks of the radius filler of FIG. 4.
Figure 13:
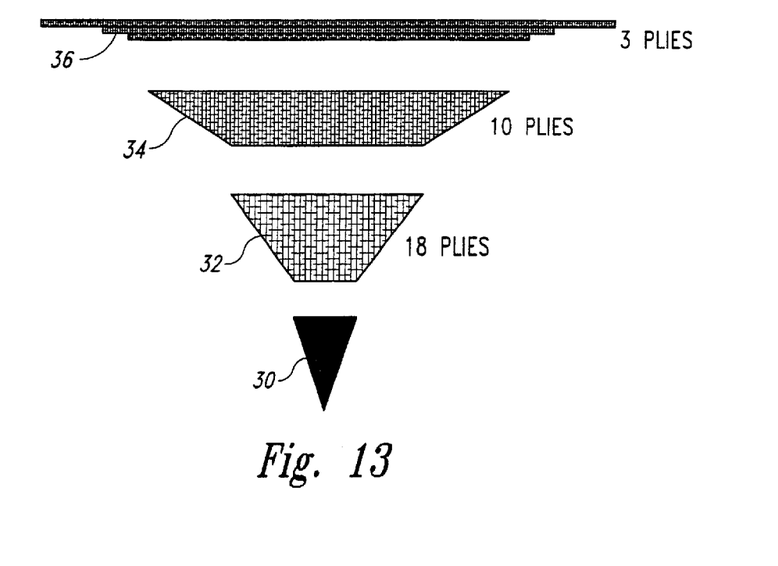
FIG. 13 shows a typical ply arrangement for forming a radius filler of the type shown in FIGS. 4 and 5.

FIG. 4 shows one embodiment of the laminated composite radius filler 24 of the present invention having a laminated fiber body 28 and a unidirectional tip 30. The laminated fiber body has two distinct sections that are trapezoidal in cross-section. The upper section 32 has 14 or 18 plies of IM7/5250-4 thin tape with ±45° orientation (i.e., the plies alternate from having a ±45° orientation relative to the X-axis (FIG. 1) and −45°). The lower section 34 is made from the same material but has 10 plies. Typically the noodle is completed with three additional plies 36 (FIG. 13). The number of plies and sections are selected to configure the radius filler to the shape of the dimple. While we recommend a ±45° orientation, other ply arrangements can be used to introduce 0° or 90° plies or even plies at some other angle. The ±45° orientation provides a radius filler having adequate strength with relative ease of bending into a sine wave configuration (FIG. 8) or other shape. 0° or 90° plies impact the ability to bend the radius filler.

Figure 6:
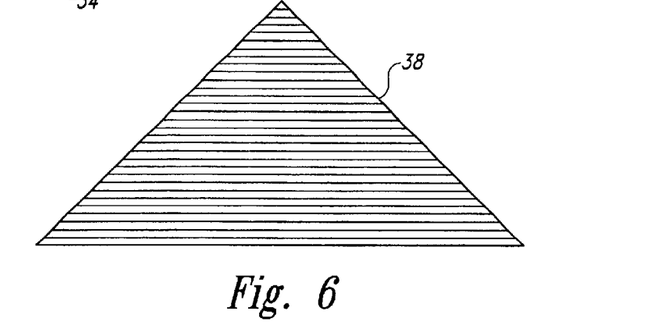
FIG. 6 shows another preferred laminated composite (multi-ply) radius filler of the present invention having a triangular cross-section.

We determined that elegant matching of the radius filler shape to the shape of the dimple was unnecessary. We also observed that overfill within a reasonable range improved performance. Therefore, our preferred radius filler today has a simple triangular cross-section 38 with thirty-eight plies at ±45° orientation for filling a 0.20-inch radius. The radius filler of FIG. 6 is a replacement for the tip-and-body radius filler of FIG. 4.

Figure 7:
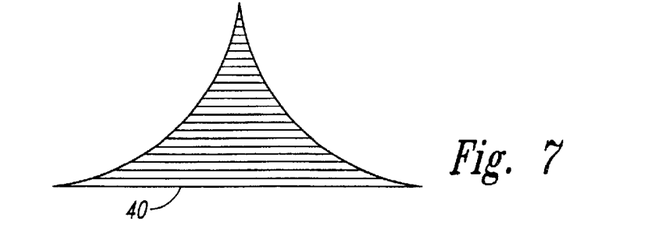
FIG. 7 shows another preferred laminated composite (multi-ply) radius filler of the present invention having sidewalls of a generally triangular shape curved to match roughly the intended radius.
Figure 10:
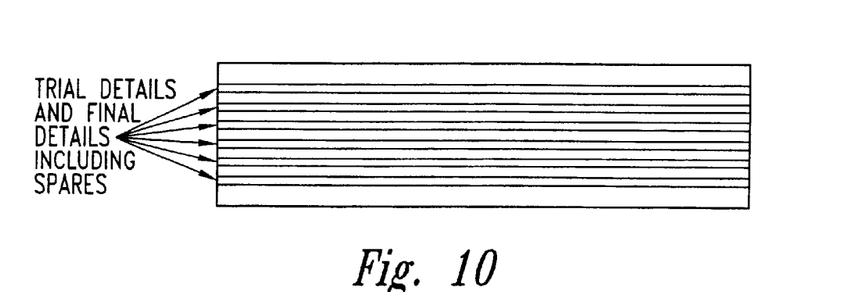
FIG. 10 shows a typical layout in plan view for cutting the radius fillers of FIG. 6 from a laminate.
Figure 12:
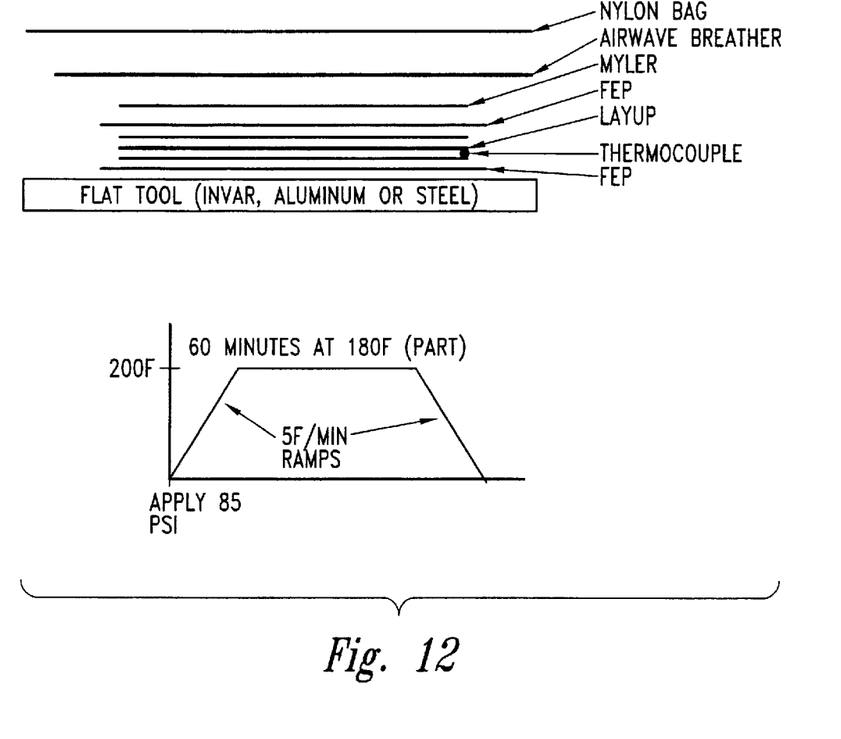
FIG. 12 shows the preferred layup and processing thermal cycle to prepare the laminate of FIG. 10 in preparation for cutting radius fillers of the present invention.

If the overfill from using a triangular cross-section will be excessive (and we question whether it can be if you can squeeze the noodle into the dimple), you might shape the radius filler 40 as shown in FIG. 7 using planes, gouges, or other cutting tools. We prefer straight sides in an isosceles right triangle because this shape can be easily cut from debulked laminate using an ultrasonic cutting table (See FIG. 10). FIG. 1 shows proper installation of the radius filler 38 in the dimple. FIG. 12 illustrates the apparatus and heat-pressure cycle for debulking the radius filler. FIGS. 14–19 illustrate the debulking sequence in greater detail. As shown in FIG. 12, the operation is relatively simple: vacuum bag the plies on a mandrel using an FEP release film to protect against sticking the radius filler to the mandrel. Then, in an autoclave or other suitable pressure vessel, expose the "green" radius filler to 85 psi pressure at 200° F. for 60 minutes with 5° F./min heat up and cool down temperature ramps. This cycle is used to debulk the sections 32 or 34 or the entire radius filler 38 prior to ultrasonic cutting.

We lay up the plies in accordance with BPS 5PTPLB01-C, hot debulk per PTS 98 PTS-001, Rev. A, and ultrasonically trim using a GFM US-50 cutter. We place one ply of porous FEP (fluorinated ethylene propylene) film between the "green" radius filler and the lay up mandrel (table). The cutter uses a GFM UK-72 Cl.0 knife carried on a sonotrobe horn at 5000 mm/min (about 550 in/min) with 30–40% amplitude and a 30° lead angle.

Figure 14:
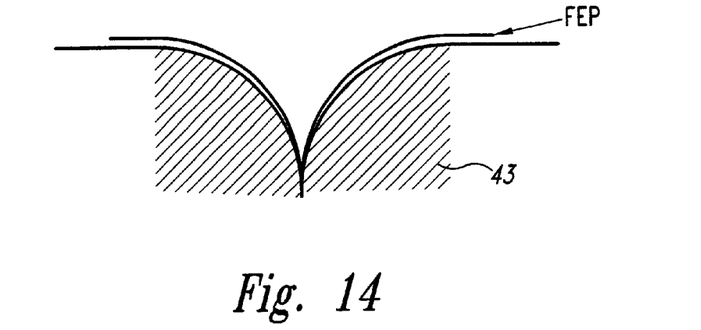
FIGS. 14, 15, and 16 show the sequence of debulking a radius filler of the type shown in FIG. 13, to prepare it for use.
Figure 15:
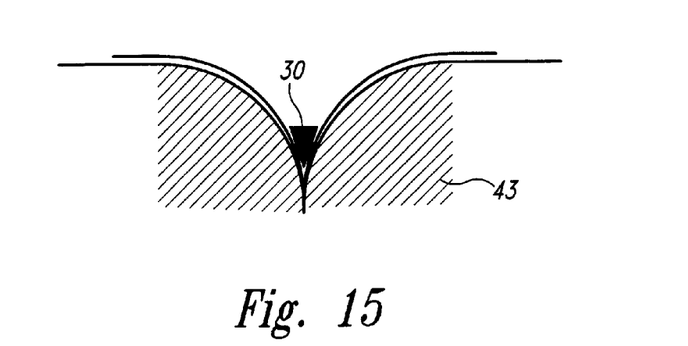
Figure 16:
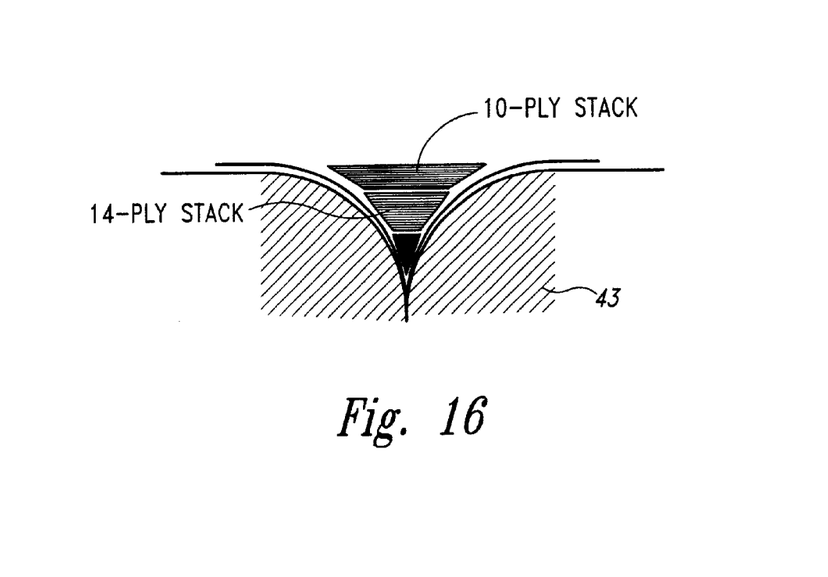
Figure 17:
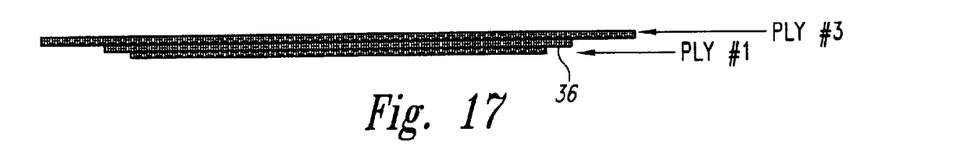
FIGS. 17 and 18 show the details of a 3-ply base for a radius filler and its installation, in the debulking operation.
Figure 18:
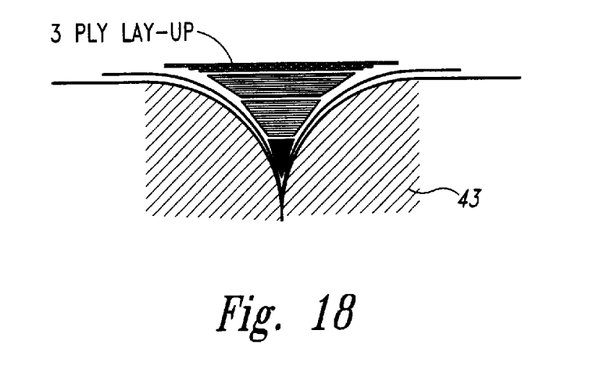
Figure 19:
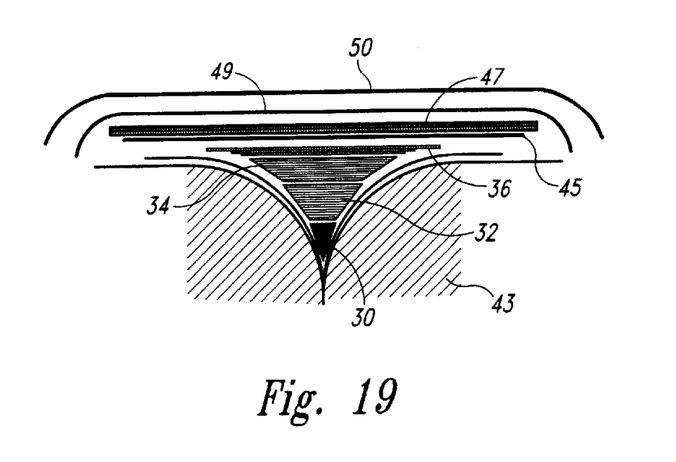
FIG. 19 shows the bagging sequence for the debulking sequence shown in FIGS. 14–18.

To make the multistacked laminated radius filler of FIG. 4, place the tip 30 on FEP release plies in the noodle tool 43 (FIGS. 14 and 15). Then, position the body sections 32, 34, and 36 (FIGS. 16, 17 and 18) before bagging the lay up under a solid FEP film 45, caul plate 47, breather 49, and vacuum bag 50 (FIG. 19) for the hot debulk previously described.

The preferred radius filler (unitary or multistack) is easy to manufacture, affordable, and robust. This radius filler actually is easier to make (less time consuming than the common unidirection pultrusion radius filler).

When cutting the laminates with the ultrasonic cutter, we might mask the laminate with masking tape to provide adequate stiffness.

Table 1 compares the pull off strength between a co-cured skin and spar for a unidirectional radius filler like those shown in FIGS. 2 and 3, with a laminated radius filler of the present invention. The strengths were measured using two-foot spar specimens.

TABLE 1

|  | Unidirectional Radius Filler | Laminated Radius Filler |
| --- | --- | --- |
| Average Pull Off Strength | 1275 lb/in | 1610 lb/in |
| Standard Deviation | 276 lb/in | 125 lb/in |
| Coefficient of Variation (COV) | 21.6% | 7.7% |
| Population | 23 | 24 |

Table 2 shows similar test results this time using seven-foot spar specimens.

TABLE 2

|  | Unidirectional Filler | Laminated Filler |
| --- | --- | --- |
| Average Pull Off Strength | 1285 lb/in | 1544 lb/in |
| Standard Deviation | 386 lb/in | 102 lb/in |
| Coefficient of Variation | 30% | 6.6% |
| Population | 5 | 8 |

These results demonstrate a 20% to 25% improvement in pull off strength for laminated radius filler in co-cured joints compared to the same structure with a unidirectional radius filler. A two to three-fold reduction in variability has also been demonstrated. The seven-foot spar is representative of the size and type used in military aircraft structure. The laminated radius filler was robust relative to scale up based on the comparison of variability between the two and seven-foot spars.

Table 3 compares the pull off strengths for laminated radius fillers made by hand or with an automated technique similar to what would be used to make the radius filler for actual production of composite assemblies. Automating the manufacture did not significantly impact performance of the radius filler.

TABLE 3

|  | Hand Laid Laminated Filler | Automated Laminated Filler |
| --- | --- | --- |
| Average Pull Off Strength | 1585 lb/in | 1598 lb/in |
| Standard Deviation | 131 lb/in | 118 lb/in |
| Coefficient of Variation | 8.3% | 7.4% |
| Population | 12 | 19 |

Table 4 shows performance of several variants of the radius filler of the present invention. These test results confirm that the radius filler concept provides radius fillers having adequate strength. Also, the desired strengths can be achieved repeatedly. The radius filler performs consistently so that the composite assembly has a strength that is predictable by design and confirmed in testing within a narrow range of variation.

TABLE 4

| X-Noodle | 10 | 10A | 14 Manual | 14 Multi-Stack | Drape U | Drape L |
| --- | --- | --- | --- | --- | --- | --- |
| R1 | 1581 | 1831 | 1403 | 1731 | 1739 | 1481 |
| R2 | 1585 | 1547 | 1419 | 1656 | 1463 |  |
| R3 | 1554 | 1736 | 1532 | 1705 | 1616 | 1600 |
| R4 | 1472 | 1753 | 1580 | 1596 | 1859 | 1562 |
| Average | 1548 | 1717 | 1484 | 1672 | 1617 |  |
| Std. Dev. | 52.5 | 120.5 | 86.2 | 59.4 | 140.8 |  |
| COV % | 3.4 | 7.0 | 5.8 | 3.6 | 8.7 |  |

First crack, lb/in
11 multi-stack specimens
Average = 1636-lb/in
C.O.V. = 7%
Low = 1463 lb/in
High = 1859 lb/in Typically, the radius filler is made from the same resin and fiber used in the spar and skin.

In some cases the tip 30 can be eliminated because the volume it fills is so small.

The ply orientation can be selected so that the coefficient of thermal expansion (CTE) for the radius filler closely matches that of the bulk composite. CTE matching reduces the possibility of the radius filler cracking from thermal stresses. The ply orientation can also be adjusted to obtain the optimum modulus for joint performance. The plies extend fibers across the region where cracks normally form when using conventional unidirectional noodles.

Because the preferred radius filler fills or overfills the dimple, there is less likelihood of resin depletion occurring by bleeding of resin from the surrounding structural plies.

If desired, some plies in the body sections can use unidirectional tape.

Our test data shows an increase in strength of about 20–25%; consistent, repeatable performance; and a 2 or 3-fold reduction in variability.

We estimate that the laminated composite radius filler will reduce the cost of a national fighter wingbox structure by 15% and will reduce the weight of the wingbox by 100 pounds in a co-cured unitized structure. A lighter structure permits higher performance, longer range, or a combination of both. A reduced fastener count eases assembly, improves survivability, and reduces maintenance costs.

While we have described preferred embodiments, those skilled in the art will readily recognize alternatives, variations, and modifications that might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. A method for making a radius filler, comprising the steps of:

(a) optionally, making a composite tip with unidirectional fibers with unidirectional fibers in the form of a wedge;

(b) making a laminate of debulked plies of fabric reinforced composite substantially the shape of the radius gap that the radius filler fills and having at least one ply oriented at +45° and another ply oriented at −45° relative to the longitudinal axis of the filler.

2. The method of claim 1 further comprising the step of cutting the laminate to shape using an ultrasonic cutter.

3. The method of claim 1 further comprising the step of selecting the ply orientation so that the coefficient of thermal expansion for the radius filler closely matches that of the bulk composite to reduce cracking from thermal stresses.

* * * * *

UNITED STATES PATENT AND TRADEMARK OFFICE
CERTIFICATE OF CORRECTION

PATENT NO. : 6,709,538 B2
DATED : March 23, 2004
INVENTOR(S) : Panagiotis E. George, Kirk B. Kajita and Barry P. Van West It is certified that error appears in the above-identified patent and that said Letters Patent is hereby corrected as shown below:

<u>Column 7,</u>
Line 11, claim 1 should read,
-- 1. A method for making a radius filler, comprising the steps of:
  (a) optionally, making a composite tip with unidirectional fibers in the form of a wedge;
  (b) Making a laminate of debulked plies of fabric reinforced composite substantially the shape of the radius gap that the radius filler fills and having at least one ply oriented at + 45° and another ply oriented at - 45° relative to the longitudinal axis of the filler. --

Signed and Sealed this

Third Day of August, 2004

JON W. DUDAS
*Acting Director of the United States Patent and Trademark Office*